United States Patent [19]
Hwang

[11] Patent Number: 5,885,026
[45] Date of Patent: Mar. 23, 1999

[54] SYSTEM AND METHOD FOR CONTAINING LEACHATE USING SUBMERGED COUNTERFLOW SINK

[75] Inventor: Daekyoo Hwang, 1671 Bow Tree Dr., West Chester, Pa. 19380

[73] Assignees: LG Engineering Co., Ltd., Seoul, Rep. of Korea; Daekyoo Hwang, West Chester, Pa.

[21] Appl. No.: 865,284

[22] Filed: May 29, 1997

Related U.S. Application Data

[60] Provisional application No. 60/018,708 May 30, 1996.

[51] Int. Cl.$^6$ .................................................. B09B 1/00
[52] U.S. Cl. ........................ 405/129; 405/36; 405/52; 405/128; 210/901
[58] Field of Search ............................... 405/36, 52, 128, 405/129; 210/901; 166/50

[56] References Cited

U.S. PATENT DOCUMENTS

| | | |
|---|---|---|
| 4,335,978 | 6/1982 | Mutch . |
| 4,362,434 | 12/1982 | Valiga et al. . |
| 4,580,925 | 4/1986 | Matich et al. . |
| 4,678,369 | 7/1987 | Gläser . |
| 4,696,599 | 9/1987 | Rakoczynski et al. . |
| 5,080,528 | 1/1992 | Ressi di Cervio . |
| 5,092,709 | 3/1992 | Davis . |
| 5,199,816 | 4/1993 | Paurat et al. . |
| 5,252,226 | 10/1993 | Justice . |
| 5,605,417 | 2/1997 | Englert et al. . |
| 5,676,207 | 10/1997 | Simon et al. .................. 405/128 X |
| 5,716,164 | 2/1998 | Biro et al. ..................... 405/128 |
| 5,800,090 | 9/1998 | Goughnour ................... 405/52 X |

OTHER PUBLICATIONS

Arzu, A. and Ungari, E., "Impatti Ambientali Connessi Con il Trattamento e Lo Smaltimento Dei Rifiuti Urbani, Speciali e Dei Liquami," pp. 26–27.

Haug, M. D.; Forgie, D. J. L; and Barbour, S. L., "Design of a hydrodynamic leachate containment system," Can. J. Civ. Eng., vol. 16, 1989, pp. 615–626.

(List continued on next page.)

*Primary Examiner*—George Suchfield
*Attorney, Agent, or Firm*—Ratner & Prestia

[57] ABSTRACT

A method and system for collecting and containing leachate from a landfill uses a submerged drainage sink to develop a flow pattern towards the drainage sink contained within a containment zone, and therefore minimizes the chance of contaminating area groundwater. In a first embodiment of the invention for use in a substantially flat area, a perimeter barrier wall is provided and extends downward into a bottom barrier layer, such as an aquitard, a clay layer, or a synthetic material. The barrier wall and the bottom barrier layer define a containment zone containing the drainage sink, which is disposed below the groundwater level. Leachate and groundwater are permitted to mix within the sink. The desired flow pattern towards the drainage sink is induced by collecting and removing the leachate/groundwater mixture from the drainage sink to lower the leachate level in the drainage sink to a level which is below the groundwater level outside of the wall and below the piezometric level below the sink. Although the sink is submerged, substantially all of the waste is placed above the groundwater level by covering the sink with a layer of earthen material to a level such that the top of the earthen material is above the groundwater level and placing the waste on top of the earthen material. In another embodiment for use at a valley fill site, groundwater ridges, an upward flow pattern beneath the valley floor, and a barrier wall crossing the valley floor along the lowest edge of the landfill form a containment zone to contain a drainage sink comprising a blanket drain and a plurality of trench drains. In this embodiment, recharge trenches are used outside of the barrier wall and along or inside the groundwater ridges to maintain the groundwater levels at these points above the corresponding groundwater levels inside the containment zone.

25 Claims, 8 Drawing Sheets

OTHER PUBLICATIONS

"Cleanup Costs: Groundwater Protection and Leachate Control," *HMC*, Jul./Aug. 1990, pp. 55–58.

Kufs, C.; Rogoshewski, P.; Repa, E.; and Barkley, N., "Alternatives to Ground Water Pumping for Controlling Hazardous Waste Leachates," *Remedial Response*, pp. 146–149.

Giddings, T., "The Utilization of a Ground–Water Dam for Leachate Containment at a Landfill Site," pp. 23–29.

Robinson, H., "Design and Operation of Leachate Control Measures at Compton Bassett Landfill Site, Wiltshire, U.K.," *Waste Management & Research* (1987) 5, pp. 107–122.

Marriott, J., "Some Practical Aspects of Control of Leachate from Landfill Sites," Sep. 1981, pp. 513–527.

Dilaj, M. and Lenard, J. F., "Leachate Control at Landfills Based on Hydrogeological Studies," *Public Works*, Apr., 1975, pp. 91–94.

SYSTEM AND METHOD FOR CONTAINING LEACHATE USING SUBMERGED COUNTERFLOW SINK

This application claims the benefit of U.S. Provisional Application No. 60/018,708, filed on May 30, 1996.

FIELD OF THE INVENTION

The purpose of this invention is to contain and recover leachate generated from waste management units reliably and economically. This invention can be applied to construction and operation of any new waste management unit (e.g., landfills, waste ponds, waste piles, land farms, waste treatment areas) that generate leachate. The term "landfill" will be used to represent these waste management units to avoid repeating these other terms.

BACKGROUND OF THE INVENTION

Figure 1:
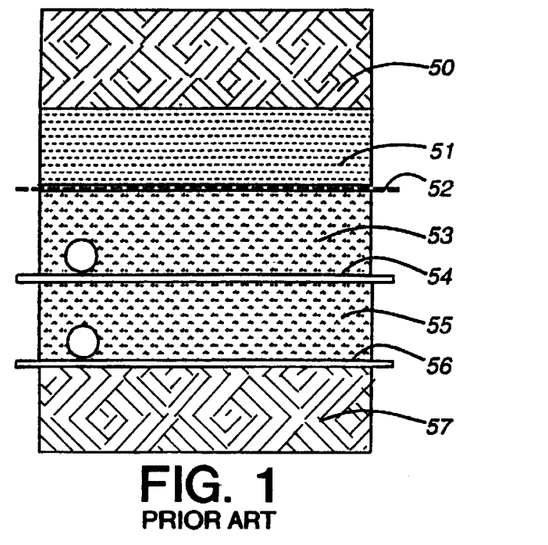
FIG. 1 is a cross-sectional view of a known bottom liner system for containing leachate.

Landfills generate leachate due to liquids present in the wastes and rainwater percolating into the waste. Unless properly contained, leachate contaminates groundwater under the landfill, and the contaminated groundwater flows farther and contaminates larger downgradient areas. Most landfills of earlier days did not have a proper leachate containment feature and contaminated groundwater. Since the late 1970s, federal and state regulations required landfills to have a bottom liner to minimize leachate releases. The bottom liner is an impermeable or low permeability material covering the entire bottom area of the landfill. For proper leachate containment, the leachate accumulating on the bottom liner should be removed. Therefore, the bottom liner almost always includes a leachate recovery feature. With time, the regulations became tighter and required multiple layers of liners and leachate recovery features. A typical bottom liner system required for modern landfills is shown in FIG. 1 and consists of the following components below a waste layer 50:

Soil layer 51—This is a cushion layer protecting the bottom liner components below from earthwork equipment during waste placement.

Geotextile layer 52—Geotextile is a textile made of synthetic polymer fibers and used for construction applications. Geotextile layer 52 used here separates the overlying soil layer and underlying sand layer while allowing liquid to flow through.

First Sand/Pipe layer 53—This layer is designed to remove leachate accumulating on the first layer of Flexible Membrane Liner (FML) 54. Therefore, this layer is called LCRS (Leachate Collection and Recovery System) and consists of permeable materials and drain pipes.

First FML layer 54—This is the first layer of FML. FML is a polymeric membrane sheet and almost impermeable, forming a good barrier to liquid flow. The use of an FML layer for liquid containment is very common.

Second Sand/Pipe layer 55—This layer is designed to remove leachate leaking through first FML layer 54 and then accumulating on second FML layer 56. This layer is called LDRS (Leachate Detection and Recovery System) and is very similar to LCRS.

Second FML layer 56—This is the second FML barrier designed to contain liquid leaking through first FML layer 54.

Clay layer 57—This layer is the third barrier designed to reduce leachate leakage through second FML layer 56.

An FML layer and a clay layer joined together as shown in FIG. 1 are often called a composite liner.

Intact Flexible Membrane Liners FMLs) have good liquid containment properties. However, FMLs in service have some defects (e.g., holes, tears, slits, open seams, etc.) developed during manufacturing or field installation. Leachate can leak through these defects. In the system shown in FIG. 1, second FML layer 56 and second sand/pipe layer 55 (i.e., LDRS) are used to contain the leachate leaking through first FML layer 54. Since clay has a low permeability, clay layer 57 below second FML layer 56 can reduce leachate leakage through the defects in second FML layer 56. The bottom liner system of FIG. 1 consists of a double liner and a double leachate recovery layer. Depending on the level of protection required, a bottom liner system may include a single liner and a single leachate recovery layer, triple liners and triple leachate recovery layers, or other variations.

Figure 2:
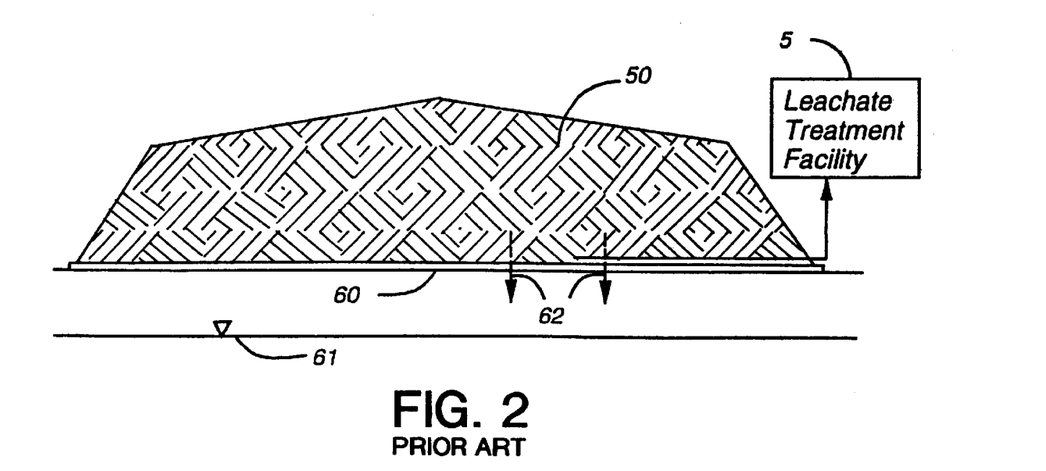
FIG. 2 is a side view showing the location of the known bottom liner system shown in FIG. 1.

As shown in FIG. 2, a conventional bottom liner system 60 is installed at the bottom of the landfill waste 50 and substantially above the groundwater table 61 to protect groundwater. In this setting, leachate accumulating on the liner has a tendency to flow downward, as shown by leachate flow direction arrows 62, regardless of the level of protection provided. Most of the leachate is withdrawn and delivered to leachate treatment facility 5.

Other prior art related to this invention includes the following:

Barrier walls—Barrier walls are any of low-permeability, vertical walls installed to cut off horizontal flow of contaminated groundwater. Types of barrier walls include soil-bentonite trench walls, vibrated-beam walls, sheetpile walls, and membrane walls. They have been used to contain contaminated groundwater from old waste sites or spill sites. Barrier walls are often used with a trench drain or a series of wells designed to recover contaminated groundwater from the area enclosed by the barrier wall.

Underdrain—Underdrains are permeable materials and pipes placed beneath earthen materials (e.g., soil, rock, ore pile, tailings) to recover liquids flowing through the earthen material. An underdrain is similar to the sand/pipe layer 53 of the bottom liner system if installed on a bottom liner. If used without a bottom liner, it cannot stop downward leakage of liquids; it only recovers a portion of liquids.

Trench drain—Trench drains are in common use to lower the water table or to recover groundwater. Typical construction includes a narrow trench extending below the water table, a drain pipe installed at the bottom of the trench, gravel or other permeable material filling the trench, and geotextile enveloping gravel to keep the surrounding soil from clogging gravel.

SUMMARY OF THE INVENTION

A drainage sink consisting of various embodiments of permeable materials and drain pipes is submerged under the water table in the uppermost geologic unit beneath the landfill. This submerged drainage sink is used as a key component of the landfill to contain and to recover the leachate. Leachate is allowed to flow freely into the drainage sink and is mixed with groundwater in the drainage sink. The mixture of leachate and groundwater then flows through drain pipes in the drainage sink to the collection sumps. From the collection sumps, the mixture is pumped out for treatment. The natural hydrogeologic conditions, artificial barriers, and various water level control features are combined to induce a counterflow condition toward the drainage sink. The counterflow condition refers to the flow of water from the surrounding zones to the drainage sink, an opposite direction of leachate flow than in the bottom liner system in which the direction of flow is from the landfill to the surrounding zones. The counterflow condition is induced through natural or artificial barriers to minimize the water flow rate. Submerging the drainage sink and inducing the counterflow condition, while disposing the waste above the groundwater level, enable reliable and economical leachate containment.

A first embodiment of the present invention is directed to a method and unit for containing and recovering leachate at a waste management area which is substantially flat and has a bottom barrier layer of low permeability material, such as an aquitard (a natural deposit), a clay layer (a constructed barrier), or a synthetic layer (e.g., an FML layer). The drainage sink is securely contained within a containment zone bounded by the bottom barrier layer and a perimeter barrier wall extending into the bottom barrier layer. Leachate and groundwater are permitted to mix within the drainage sink. A flow pattern is induced in directions from the surrounding areas (i.e., the uppermost water bearing geologic unit outside the wall and the zone below the drainage sink) toward the drainage sink. This flow pattern is induced by collecting and removing the mixture from the drainage sink to lower the leachate level in the drainage sink to a level which is below the groundwater level outside of the wall and below the piezometric level below the sink. The sink is covered with earthen material in an amount sufficient to extend above the groundwater level. Waste is placed on top of the earthen material such that all (or substantially all) of the waste is above the groundwater level. In this way, when the landfill is closed and the waste is permanently covered, the development of leachate from contact of waste and groundwater is minimized.

According to a preferred embodiment of the present invention, the waste management area has an uppermost aquitard reasonably close to the surface. For example, the waste management area may have an uppermost aquitard or an uppermost non-aquitard underlain by an uppermost aquitard. In this embodiment, the bottom barrier layer is selected to be the uppermost aquitard, and the perimeter barrier wall extends into the uppermost aquitard to contain, with the uppermost aquitard, the submerged drainage sink and to define, with the uppermost aquitard, the containment zone. The uppermost aquitard could be relatively thick and could be underlain by an aquifer.

According to another embodiment of the present invention, the present invention can be used at a waste management area which is a valley. According to the method of this embodiment, a network of trench drains are installed to extend below the groundwater level in the valley floor and lower portions of the valley slopes. A blanket drain overlying and connected to the trench drain system extends to the upper portions of the slopes. These trench drains and blanket drain together form a drainage sink. A containment zone is defined by the groundwater ridges on the topographic ridge, an upward groundwater flow pattern beneath the valley floor, and a barrier wall crossing the lowest portion of the valley floor occupied by the landfill. Along the highest portion of the slopes, recharge trenches are installed to introduce clean water to maintain the water level high on the ridge. This high water level maintains the upward flow pattern beneath the valley floor even in dry seasons. The mixture of groundwater and leachate is recovered primarily from the blanket drain and the remainder from the trench drains. More specifically, a flow pattern is induced in directions from surrounding areas towards the drainage sink on the valley floor by selectively: (a) removing the mixture from the drain pipes to lower the leachate level in the drainage sink; (b) adding water to the valley bottom recharge trench to raise the groundwater level adjacent and outside of the barrier wall; and (c) adding water to the ridge recharge trench to increase the groundwater level at the top of the valley slope. These three steps are carried out such that the leachate level in the drainage sink is lower than the groundwater level (or piezometric level) along the containment zone boundary consisting of the barrier wall, the valley floor influenced by an upward flow pattern, and the groundwater ridges on the topographic ridges.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Typical Embodiment

Figure 3:
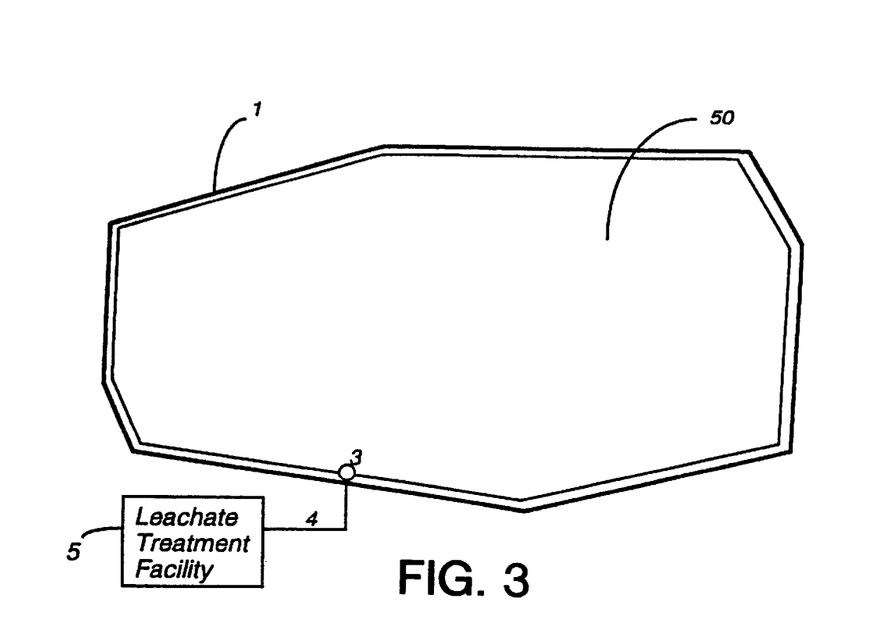
FIG. 3 is a top view of a system for containing leachate according to the present invention.
Figure 4:
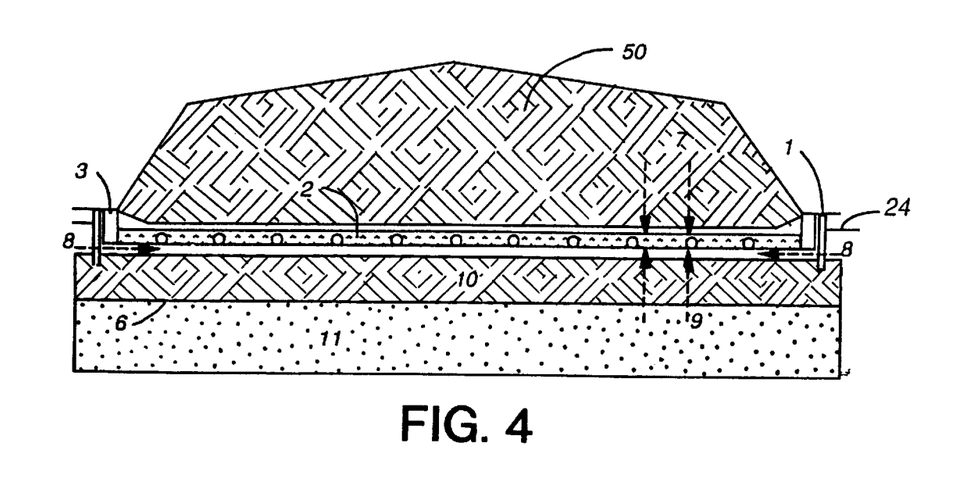
FIG. 4 is a side view of the system shown in FIG. 3.

Referring now to the drawings, wherein like reference numerals refer to like elements throughout, FIGS. 3 shows a typical layout of this invention and FIG. 4 shows a typical section. The barrier wall 1 encloses the landfill on which waste 50 is placed. The submerged drainage sink 2 is installed beneath the entire area of the landfill. Leachate from the landfill flows to the drainage sink 2 and then to the collection sump 3. From the collection sump 3, leachate is pumped to the leachate treatment facility S through the leachate pipeline 4.

The embodiment of this invention is dependent on the local hydrogeologic conditions. FIG. 4 shows the section of the typical embodiment for a landfill underlain by a water-bearing geologic unit 6, an aquitard 10 and an aquifer 11. As used herein, the terms "water-bearing geologic unit," "aquitard," and "aquifer" are used consistently with their conventional meaning. In particular, an aquifer is defined as a subsurface zone that is capable of yielding economically important amounts of water to wells and typically has a permeability on the order of $1 \times 10^{-4}$ cm/sec or higher. On the other hand, an aquitard is a subsurface zone which does not normally provide adequate water supply and typically has a permeability on the order of $1 \times 10^{-5}$ cm/sec or lower. Of course, one skilled in the art would recognize that these terms are relative and the specific values of their permeability depend on the local geologic conditions. The waste management area at which the present invention is used will have a groundwater level in the uppermost water bearing geologic unit which may be an uppermost aquitard or an uppermost non-aquitard (i.e., any other layer). In the event that the uppermost water bearing geologic unit is a non-aquitard, then this non-aquitard unit should preferably be underlain by an uppermost aquitard, and preferably not too far below. Otherwise, extending the walls to a depth of the uppermost aquitard would become costly. When no aquitard is present within a reasonable depth, a barrier layer may be constructed with a low permeability soil, in place of the aquitard, to serve as the bottom barrier layer into which the perimeter barrier wall extends. In this case, the preferred thickness of the bottom barrier layer is between 0.5 and 1.0 meters.

In the typical setting shown in FIG. 4, the piezometric level in the aquifer 11 is somewhat higher or close to the water table (i.e., groundwater level) in the uppermost water bearing zone 6. The barrier wall 1 encloses the entire landfill area and is keyed into the aquitard 10 to contain the sink 2 from the surrounding environment and to define the containment zone. The sink 2 is installed beneath the entire bottom of the landfill and below the water table 24 in the uppermost geologic unit 6. Leachate generated within the zone of waste layer 50 flows downward by gravity toward the drainage sink as denoted by the flow component 7 and is mixed with groundwater in the drainage sink. Leachate and groundwater mixture flows to the collection sump 3. Pumping leachate and groundwater mixture from the collection sump 3 lowers the leachate level in the drainage sink to a level lower than the water level outside the barrier wall and the piezometric level in the aquifer 11. As a result, water from all surrounding zones flows to the drainage sink, creating a counterflow condition. Groundwater outside the barrier wall flows through the barrier wall 1 towards the drainage sink as denoted by the flow component 8. Groundwater in the aquifer 11 flows upward through the aquitard 10 to the drainage sink as denoted by the flow component 9. Low permeability barrier wall 1 and the aquitard 10 reduce the flow volume requiring treatment and prevent leachate releases into the surrounding zones in case of temporary power failure or pump failure.

Drainage Sink Construction

The drainage sink can be built using one of three preferred embodiments depending on the permeability of the uppermost geologic unit: blanket drain method for highly permeable units, trench drain method for moderately permeable units, and combination method for low permeability units. With all three methods, the drainage sink is generally built by: providing perforated drain pipes at the bottom of the sink for collecting the groundwater/leachate mixture; connecting the drain pipes to a header pipe; and pumping the mixture from the sink through the drain pipes and header pipe.

Figure 5:
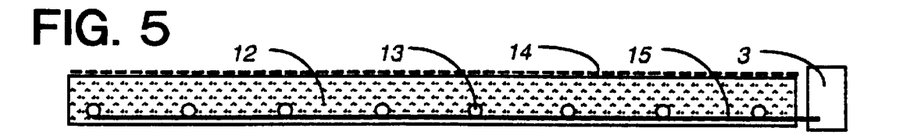
FIG. 5 is a cross-sectional view of a blanket drain system for use with the present invention.

FIG. 5 shows the blanket drain method. A blanket drain is a layer of permeable material (clean, coarse sand or gravel) covering the entire area beneath the landfill. This method is applicable when the uppermost geologic unit contains a layer of very permeable material (horizontal permeability on the order of $10^{-2}$ cm/sec or higher). The in-place material is used as the blanket drain 12. The preferred thickness of the blanket drain is 0.6 m or more. A plurality of perforated drain pipes 13 is embedded in the blanket drain 12 and connected to the collection sump 3 via the header pipe 15. The preferred pipe spacing is 50 m for coarse sand and 100 m for clean gravel. The blanket drain should be covered with a geotextile layer 14 to prevent clogging by fine particles.

Figures 6A, 6B:
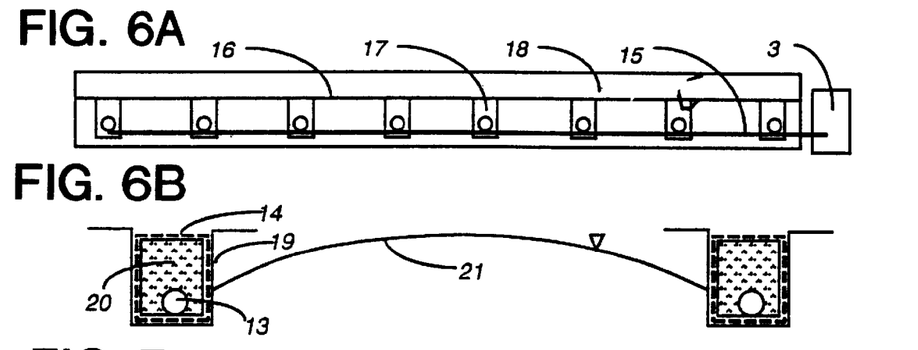
FIG. 6A is a cross-sectional view of a trench drain system for use with the present invention.
FIG. 6B is an enlarged view of two of the trench drains shown in FIG. 6A.

FIG. 6A shows the trench drain method. This method is applicable when the uppermost geologic unit is moderately permeable (sand or gravel with some fine-grained soils and horizontal permeability on the order of $11^{-3}$ to $10^{-4}$ cm/sec). A plurality of trench drains 17 are installed after excavating the site to the desirable level 16. As shown in detail in FIG. 6B, a trench drain consists of a trench 19, gravel fill 20, geotextile 14 wrapping the gravel, and perforated drain pipes 13 placed near the bottom of the trench. The trench depth is typically 0.6 to 1.2 m and the trench width is typically 0.6 m. The trench drain spacing is typically 30 to 60 m, depending on the permeability of the in-place geologic material, to prevent the leachate level 21 building up between adjacent trenches to a level higher than the piezometric level in the aquifer 11. A smaller spacing is used for a lower permeability material. The drain pipes 13 in the trench drain are tied to the collection sump 3 via the header pipe 15. The trench drains may be covered with excavated material 18.

Figure 7:
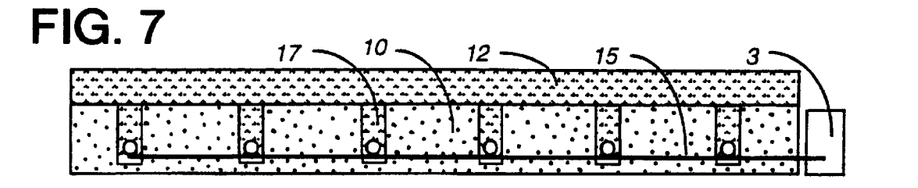
FIG. 7 is a cross-sectional view of a combined blanket drain and trench drain system for use with the present invention.

FIG. 7 shows the combination method consisting of a plurality of trench drains 17 covered with a blanket drain 12. This method is applicable when the uppermost geologic unit is not sufficiently permeable (horizontal permeability on the order of $10^{-5}$ cm/sec or lower). The blanket drain is built with imported permeable material such as coarse sand or gravel. To save the cost of imported material, this blanket drain may be built in strips to form a T-shape when combined with each trench drain. The drain pipes in the trench drain are tied to the collection sump 3 via the header pipe 15.

The perforated drain pipes in the trench drain or blanket drain should be at least 1 m below the seasonally low water level in the uppermost geologic unit 6 and the piezometric level of the unit below the drainage sink, such as lower aquifer unit 11. This submergence may be adjusted depending on the local hydrogeologic setting. The diameter of the drain pipes should be larger than 10 cm to allow free flow of water. The drain pipe material should be HDPE (high density polyethylene) or similar materials resistant to degradation by leachate. Also, the drain pipes should have a sufficient thickness. Some pipes should have a larger diameter of up to 30 cm and be equipped with cleanout ports for use of cleaning tools.

Figure 8:
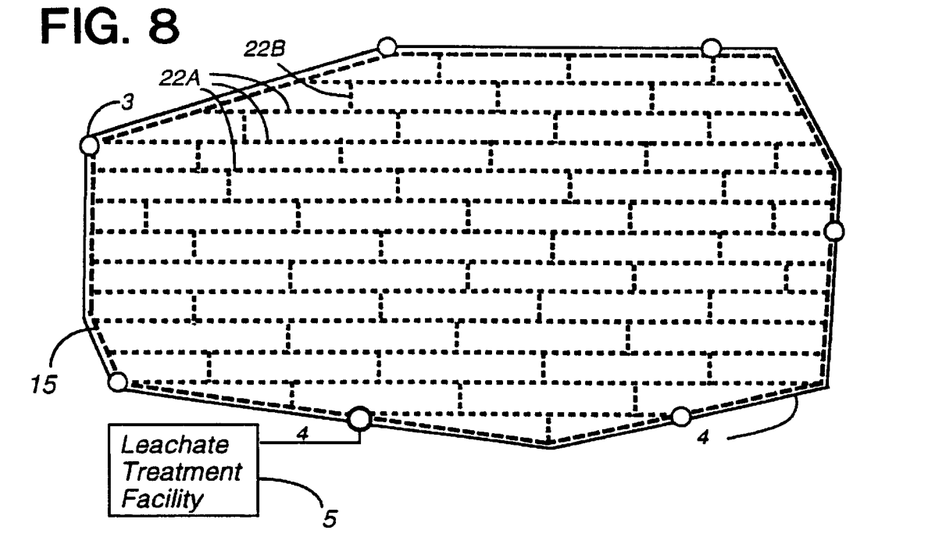
FIG. 8 is top view of a typical layout of the drain pipes in the system shown in FIG. 5 and trench drains shown in FIG. 6A and FIG. 7.

FIG. 8 shows a typical layout of the trench drain or the drain pipes in the blanket drain. The parallel drains 22A are laid out with an equal spacing. In addition to the header pipe 15, these parallel drains should be connected by lateral drains 22B at every 100 to 200 m. These laterals provide bypass flow paths when and if portions of parallel drains become ineffective due to clogging, crushing, or joint separation, etc.

After the sink is installed, the sink should be covered with a sufficient thickness of earthen material to allow for most, and preferably all, of the waste to be placed above the original water table in the uppermost geologic unit by at least 1 m. This separation is required to terminate pumping and treating water from the drainage sink when the closed landfill no longer generates leachate. The cover material should not block free flow of leachate to the drainage sink. In FIGS. 5 and 6, the uppermost geologic unit is sufficiently permeable and can be used to cover the sink. In FIG. 7 where the uppermost geologic unit is not sufficiently permeable, a blanket drain is required to allow free flow of leachate to the drain pipes in the trench drain.

All drain pipes installed within the drainage sink are connected to the collection sumps to allow flow of leachate/groundwater mixture from the sink to the collection sumps. The leachate/groundwater mixture is pumped from the sumps for treatment. Pumping from the sumps lowers the water level in the sumps, induces flow from the drainage sink to the sumps, lowers the leachate level in the drainage sink, and subsequently induces flow from the surrounding zones to the drainage zone. This sink operation also prevents leachate mounding under the landfill as denoted by the lowered water level 21 in FIG. 6B. As the drain pipes in the sink are submerged, they do not require a positive slope to allow free flow of water.

Typical Methods of Creating Counterflow Condition

The counterflow condition is created by controlling the water table or water flow direction taking advantage of the site hydrogeologic setting. Therefore, the preferred embodiment of this invention depends on the site hydrogeologic settings.

Figure 9:
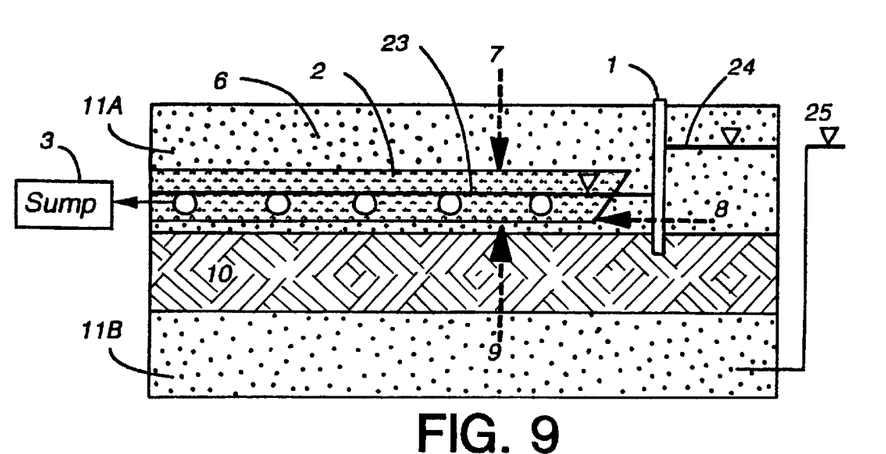
FIG. 9 is a cross-sectional view of a system according to the present invention in an aquifer/aquitard setting.

Aquifer/Aquitard Setting—FIG. 9 shows the preferred embodiment of this invention for a site underlain by a water-bearing geologic unit 6 (which in this case is an aquifer 11A), an aquitard 10, and another aquifer 11B. In this setting, the piezometric level in the aquifer 11B is generally somewhat higher than or close to the water table 24 in the uppermost water-bearing zone 6. The barrier wall 1 encloses the entire landfill area and is keyed into the aquitard 10 and defines the containment zone. The drainage sink 2 is installed below the water table 24 within the uppermost geologic unit 6 and the piezometric level 25 of the aquifer 11B. The flow component 7 is leachate flowing to the drainage sink from waste (not shown, but similar to waste 50 shown in FIG. 4). Leachate and groundwater mixture is directed to the collection sump 3. Pumping leachate and groundwater mixture from the sump 3 lowers the leachate level in the drainage sink to the level denoted by 23. In response, groundwater outside the barrier wall flows through the barrier wall 1 to the drainage sink (flow component 8) and groundwater in the aquifer 11B flows upward through the aquitard 10 to the drainage sink (flow component 9). As a result, groundwater from all surrounding zones flows to the drainage sink. The low permeability barrier wall 1 and aquitard 10 reduce the water volume requiring treatment, maintain a counterflow condition, and prevent leachate releases out of the containment zone in the event of a pump failure or significant drop in groundwater level 24. The construction steps of this embodiment include site surface preparation, installation of the barrier wall to encircle the landfill area, excavation of the sink area below the water table, installation of the sink using the blanket drain method or trench drain method, installation of the sump/pump and pipeline, and backfilling of uppermost geologic unit 6 to above the seasonally high water level. In operation, waste (not shown) is placed on top of the backfilled area such that all of the waste would be above the seasonally high water level.

Figure 10:
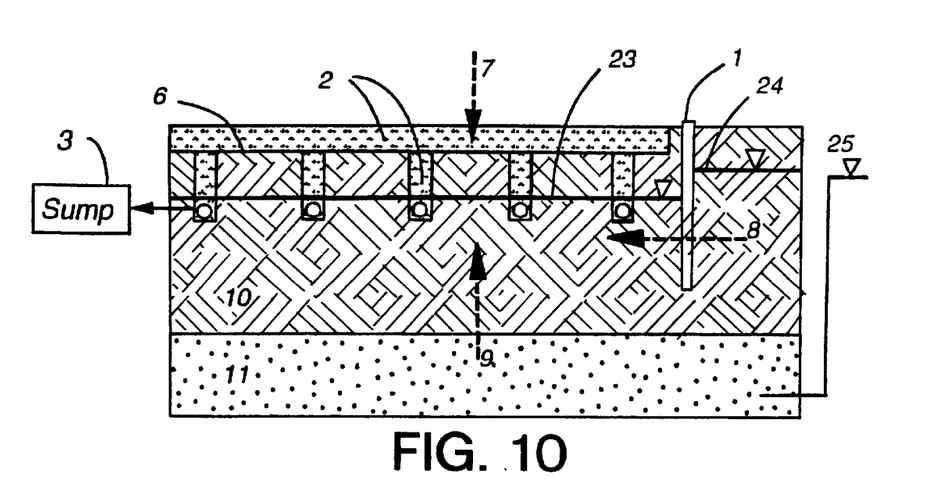
FIG. 10 is a cross-sectional view of a system according to the present invention in an aquitard/aquifer setting.

Aquitard/Aquifer Setting—FIG. 10 shows the preferred embodiment of this invention for a site at which the uppermost water-bearing geologic unit 6 is an aquitard 10, followed by an aquifer 11 below the aquitard 10. In this setting, the piezometric level 25 of the aquifer 11 is often somewhat lower than or close to the water table 24 within the uppermost water-bearing unit 6. Preferably, the barrier wall extends at least 2 m below the bottom of the sink 2 within the aquitard 10. The sink 2 is installed below the water table 24 within the uppermost geologic unit 6 and the piezometric level 25 of the aquifer 11. The flow component 7 is leachate flowing to the drainage sink from the waste (not shown). Leachate and groundwater mixture is directed to the collection sump 3. Pumping leachate and groundwater mixture from the sump 3 lowers the leachate level in the drainage sink as denoted by leachate level 23. In response, groundwater outside the barrier wall flows through or around the barrier wall 1 towards the drainage sink (flow component 8) and groundwater in the aquifer 11 flows upward through the aquitard 10 to the drainage sink (flow component 9). As a result, groundwater from all surrounding zones flows to the drainage sink. The low permeability barrier wall 1 and aquitard 10 reduce the water volume requiring treatment, maintain the counterflow condition, and prevent leachate releases out of the containment zone. The construction steps of this embodiment include site surface preparation, installation of the barrier wall to encircle the landfill area, excavation of the sink area below the water table, installation of the sink using the combination method, and installation of the sump/pump and pipeline. In operation, waste (not shown) is placed above the blanket drain area of the sink such that all of the waste would be above the seasonally high water level.

Figure 11A:
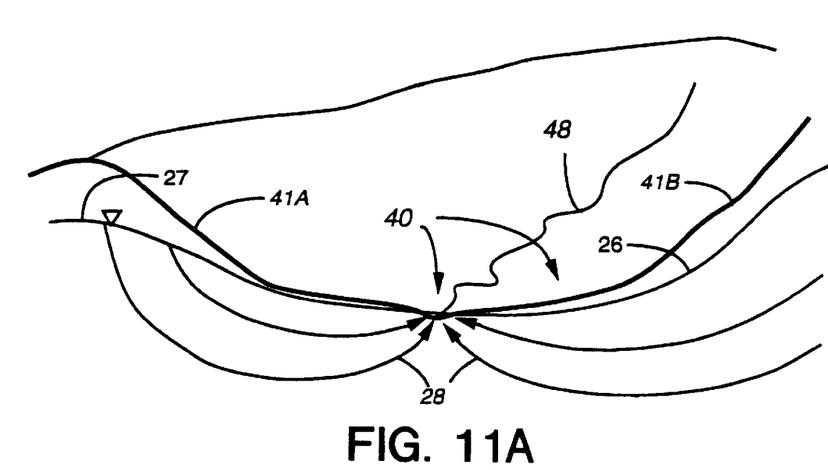
FIG. 11A is a perspective view of a valley in which a system according to a second embodiment of the present invention can be used.

Valley Fill Setting—In hilly regions, landfills are often constructed as a valley fill. This invention is applicable to this setting depicted in FIG. 11A if the valley and the surrounding hills are underlain by low permeability materials, the water table (i.e., groundwater level) 26 is relatively shallow, and the valley is drained by a gaining stream 48 (groundwater flows into the stream). The groundwater ridge 27 forms a natural barrier to lateral migration of leachate. Groundwater flows from the ridges to the valley floor 40, and the groundwater level 26 differs depending on location. In particular, the groundwater level 26 generally follows the contours of the valley slopes 41A and 41B. Groundwater beneath the stream bottom flows upward and is then drained by the stream. This flow pattern is depicted by groundwater flow lines 28. By maintaining this flow pattern (characteristics of the gaining stream) during and after the landfill operation, leachate can be contained using the drainage sink and the counterflow method of the present invention. This invention is also applicable to the losing stream (streamwater flows downward into the subsurface) if the flow pattern can be artificially modified to a gaining stream.

Figure 11B:
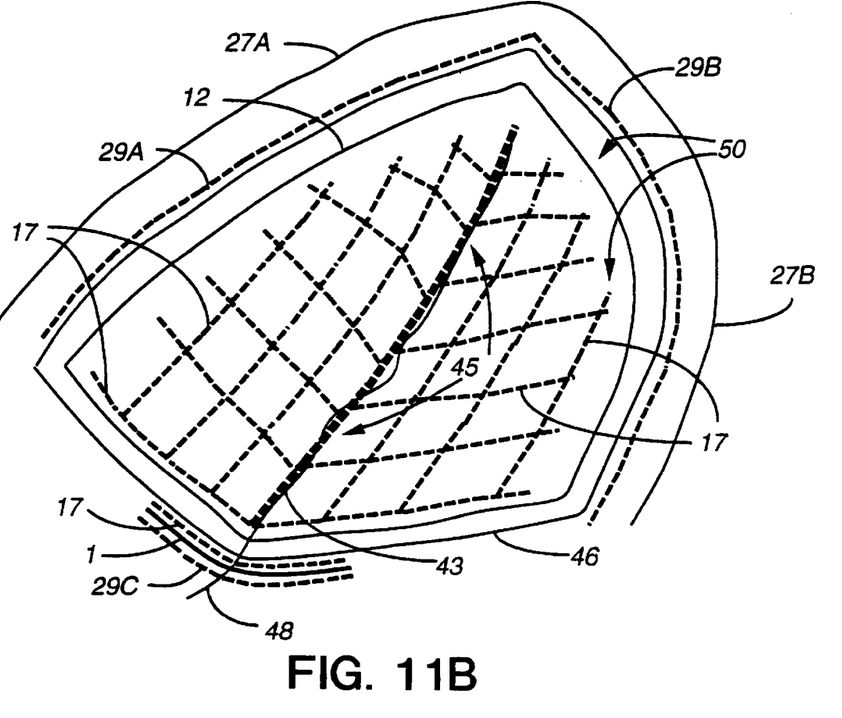
FIG. 11B is a perspective view of a valley and a trench drain layout according to the second embodiment of the present invention.

FIG. 11B is a perspective view of a valley in which the system of the present invention is incorporated. More specifically, groundwater ridges 27A and 27B direct the flow of any leachate toward the interior of the valley. From these groundwater ridges, the valley slopes downward to the valley bottom 45 along which stream 48 generally meanders. Valley bottom 45 is the central line along the lowest portion of the valley floor. The present invention involves installing a plurality of trench drains 17 in valley floor 40 including at least one bottom trench drain 43 which is disposed along valley bottom 45, which is shown as a central line in FIG. 11B. As shown in more detail in FIG. 12, the trench drains are overlain by a blanket drain 12. It is important to note that the trench drains should extend to a point below the groundwater level whenever possible. A barrier wall 1 is provided which extends downward into the low permeability geologic unit and extends across valley floor 40 towards or into each of the valley slopes to a point sufficient to contain the leachate developing from contact between waste and water in containment zone 46. One skilled in the art would easily be able to determine how long the barrier wall must be depending on the groundwater level 26, flow lines 28 and other local hydrogeologic conditions. A barrier trench drain 17 is placed adjacent and inside barrier wall 1. As before, pipes are disposed in each of the trench drains. A valley bottom recharge trench 29C is disposed adjacent and outside barrier wall 1. Furthermore, ridge recharge trenches 29A and 29B are disposed respectively at the top of each valley slope inside the groundwater ridges 27A and 27B.

Figure 12:
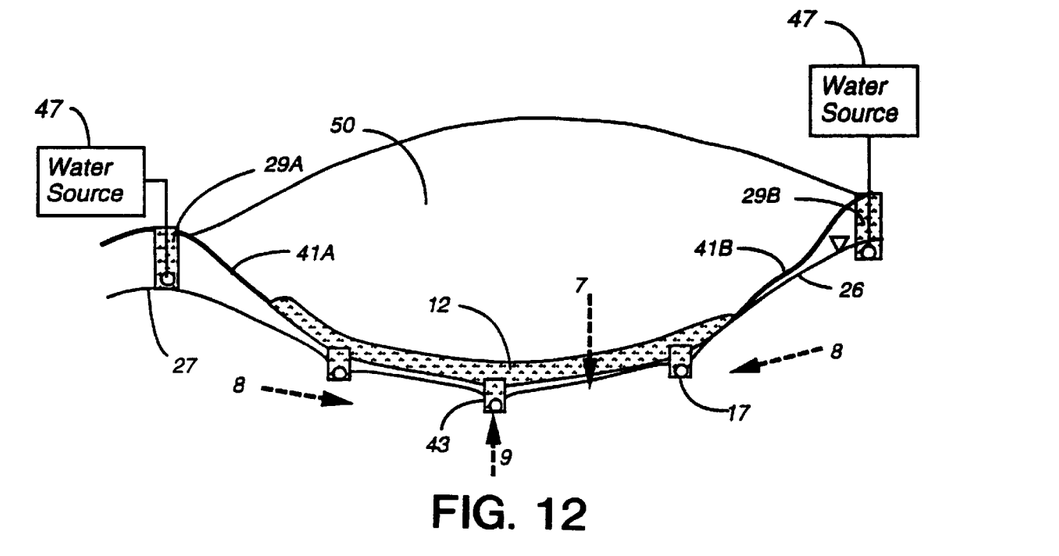
FIG. 12 is a cross-sectional view of a system according to the second embodiment of the present invention.

FIG. 12 depicts a cross-sectional view of the preferred embodiment shown in FIG. 11. As in the case of an aquitard, the drainage sink is installed using the combination method. At least a portion of the valley floor, including the valley bottom, is excavated preferably at least 2 m below the streanwater level (which is the groundwater table at this location) and the lower portions of the valley slopes 41A and 41B are also excavated to intersect the groundwater table. The extent to which the lower portions of the valley slopes are excavated depends on the groundwater flow pattern, among other factors. A blanket drain 12 and a plurality of trench drains 17 are installed in this excavation. To keep the upward flow 9 beneath the valley floor, leachate should not be allowed to build up on the valley floor. The blanket drain 12 intercepts the leachate flow 7 and directs it to the trench drains 17 without allowing leachate buildup. The ridge recharge trenches 29A and 29B are installed along the ridge or boundary of the landfill (i.e., at the tops of valley slopes 41A and 41B, respectively) to help maintain a groundwater ridge. The ridge recharge trenches 29A and 29B are similar to the trench drain 17 but are used to introduce water into the trench instead of to drain water.

Figure 13:
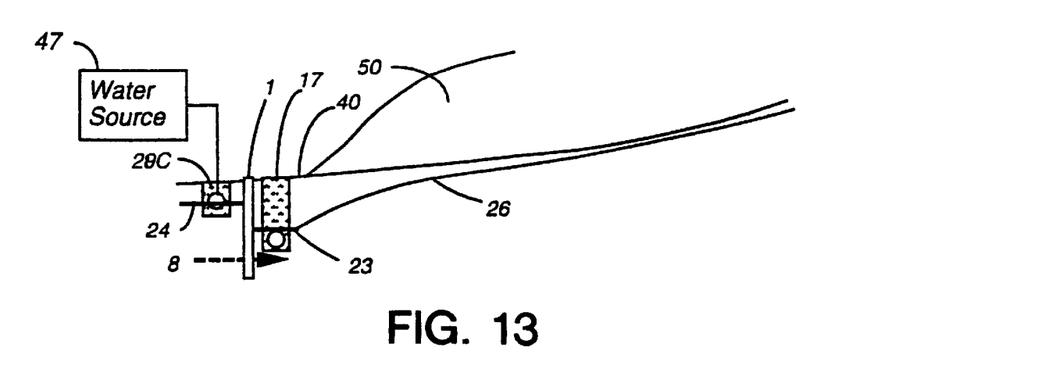
FIG. 13 is a cross-sectional view of the embodiment shown in FIG. 12, rotated 90 degrees from FIG. 12 and at the lowest edge of the landfill site at the valley floor.

Along the valley slopes 41A and 41B, portions of the blanket drain are above the water table and cannot recover 100% of leachate. As a result, a portion of leachate will reach the shallow groundwater table and be mixed into groundwater. This groundwater flows to the valley bottom 45 (flow component 8) and is collected in the trench drain 43 and trench drain 17. This is why the bottom of the trench drain 17 should extend below the original groundwater table. When the water table declines, clean water (treated leachate or groundwater pumped outside the valley) may be introduced into the recharge trenches 29A and 29B to maintain the groundwater ridge 27 as a barrier and to force water flow from the ridge 27 to the valley bottom 45. The flow rate required for recharge will not be significant because of the low permeability materials underlying the landfill. As shown in FIG. 13, the barrier wall 1 is disposed across part of the valley floor 40 to create the counterflow condition at the lowest edge of the landfill. The barrier trench drain 17 maintains the water level 23 inside the barrier wall 1 lower than the water level 24 outside the barrier wall. The valley floor recharge trench 29C may also be used to maintain the water level 24 outside the barrier wall higher than the water level 23 inside the barrier wall. This creates the counterflow condition 8 required at the lowest edge of the landfill.

As in the first embodiment, earthen material is placed over the drainage sire to a height above the groundwater level. Waste is placed on top of the earthen material so that all or substantially all of the waste is disposed above the groundwater level.

The system of the present invention can be used in a "valley" with either one or two (or more) valley slopes and one or two (or more) lowest (most downgradient) edges along the valley floor. The system only need be configured such that all of points along the lowest edges are confined by a barrier wall, and the barrier wall extends to a point such that leachate flow from the landfill can be captured. The term "valley" is used herein to refer to all of these combinations, although the situation where there is only one slope is conventionally known as a "slope fill."

The system and method of the present invention can be used in an area which was originally a shallow water body having an original surface water level. In this embodiment, the ground surface is raised above the water level by filling, and the original surface water table becomes the groundwater level. As before, the sink is installed under this groundwater level.

Special Methods of Creating Counterflow Condition

To create the counterflow condition, the water level inside the barrier wall is lowered by removing leachate from the drainage sink. Often, the natural geologic setting is not ideal for installation of the sink and creation of the counterflow condition. Also, unusual climatic conditions may disturb the site hydrogeologic setting during long tern operation. In these cases, the counterflow conditions may be created with additional means.

Figure 14:
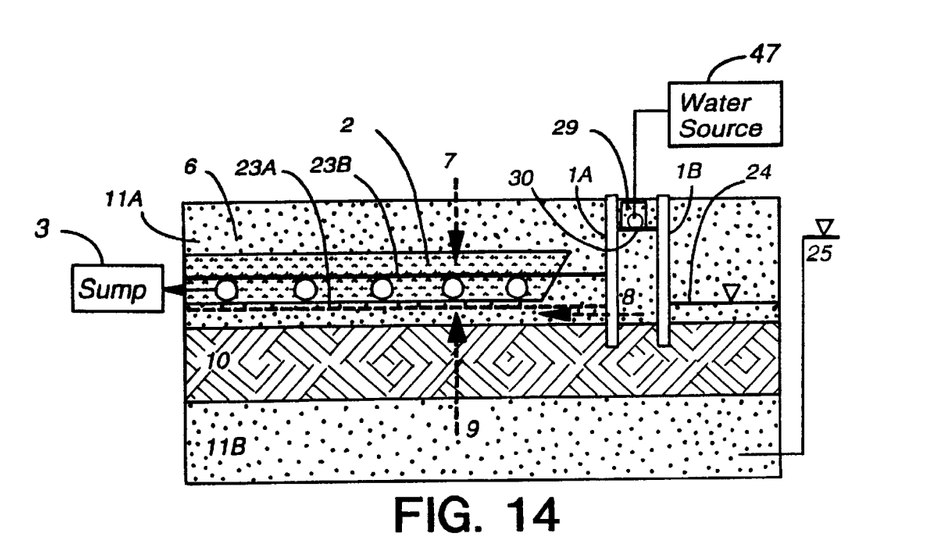
FIG. 14 is a cross-sectional view of a preferred embodiment of the present invention.

Recharge Barrier Wall—To maintain the counterflow condition within the uppermost geologic unit, the water level outside the barrier wall should be higher than the water level inside the barrier wall. This condition is normally created by lowering the leachate level in the drainage sink. When the water layer in the uppermost geologic unit is too thin to install the drainage sink sufficiently below the water table, the counterflow condition cannot be created solely by removal of leachate from the drainage sink. In this case, the counterflow condition can be created by raising the water level outside the barrier wall as shown in FIG. 14. A second perimeter barrier wall 1B is installed around the landfill radially outward of the first perimeter barrier wall 1A to define a recharge trench 29. With this embodiment, the water level 30 in the recharge trench 29 inside the two walls can be maintained higher than the water level 23A in the containment zone by supplying clean water from water source 47 to recharge trench 29 as needed, and the counterflow condition 8 is created. In combination with the flow component 9 from the aquifer 11, this counterflow condition raises the leachate level in the drainage sink to 23B, enabling recovery of leachate and groundwater mixture. For a drainage sink submerged during normal operation, the water level outside the barrier wall could decline too much unexpectedly due to drought or other hydrogeologic changes. In this case, the counterflow condition may be restored using this method. For a temporary measure, the recharge trench 29 alone may be used. The use of a recharge trench alone will require more clean water recharge from water source 47 in return for saving the cost of the second barrier wall.

Figure 15:
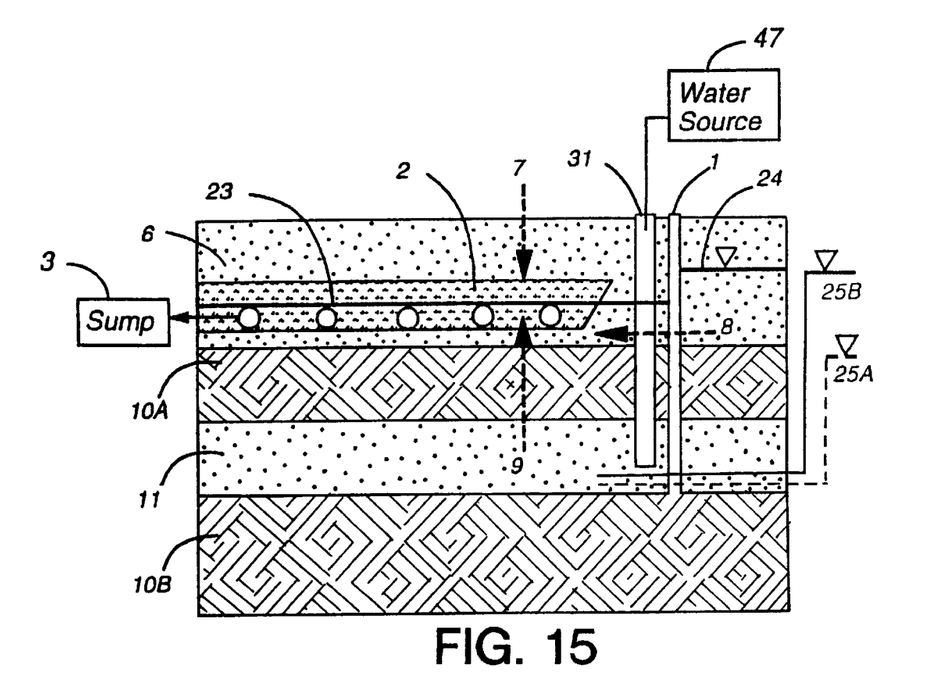
FIG. 15 is a cross-sectional view of another preferred embodiment of the present invention.

Injection Well—FIG. 15 depicts the injection well method. When the piezometric level in the aquifer 11 is not sufficiently high to induce the counterflow 9, the piezometric level in the aquifer 11 may be raised using injection wells. In this method, clean water from water source 47 is injected to the aquifer 11 via the injection well 31. The original piezometric level 25A is raised to a new level 25B. To maintain this high piezometric level within the aquifer 11, the barrier wall 1 should fully penetrate the aquifer 11 and be keyed into the second aquitard 10B below the aquifer 11, which is below the uppermost aquitard 10A. Thus, the injection well method cannot be used for a site where the second aquitard 10B is too deep to install the barrier wall economically.

Figure 16:
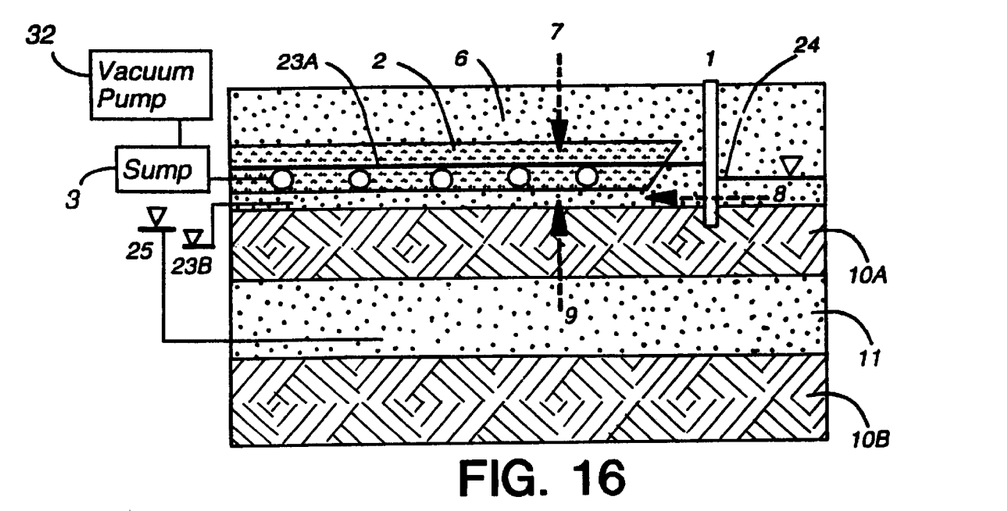
FIG. 16 is a cross-sectional view of still another preferred embodiment of the present invention.

Vacuum Pumping—Another method of inducing the counterflow condition is applying vacuum to the drainage sink as shown in FIG. 16. This method may be used when the water level outside the barrier wall and the piezometric level in the aquifer 11 both decline too much to maintain the counterflow condition. In this case, lowering the pressure in the drainage sink by vacuum pumping can create the counterflow condition. Large vacuum pumps 32 are connected to the sumps 3 to lower the atmospheric pressure exerted on the water table in the drainage sink. The original water level 23A in the drainage sink decreases to an equivalent water level 23B after considering the effect of the vacuum and creates the counterflow condition. This method is effective after the closure of the landfill with an impermeable cover.

Methods of Reducing Flow Rate

In the bottom liner system, only leachate is collected and treated. In this invention, a substantial volume of groundwater flows into the drainage sink and is mixed with leachate before recovery and treatment. The groundwater flow rate through the barrier wall is insignificant because the barrier wall is constructed to have a sufficiently low permeability and the total flow area is not large. Depending on the permeability of the bottom barrier layer (i.e., either an aquitard, synthetic layer, or constructed clay layer), the groundwater flow rate through the bottom barrier layer may be significant because of the large flow area (the flow area equals the landfill area). As pumping and treating a large volume of water will increase the leachate treatment cost, the flow volume should be minimized to the extent feasible. The flow rate to the drainage sink may be reduced by one or more of the following options.

Intermittent Pumping—Continuous pumping maintains a steady flow rate. Intermittent pumping can reduce the overall flow rate. In intermittent pumping, the pump is turned off once the leachate level in the drainage sink is lowered to a preset level. The leachate level in the drainage sink is then allowed to recover close to the equilibrium level. During this recovery, the flow rate decreases gradually until the next pumping cycle begins.

Constructed Bottom Barrier Layer—If the permeability of the aquitard below the drainage sink is not sufficiently low, a layer of low permeability material may be installed below the drainage sink. The bottom barrier material may include compacted clay, bentonite blanket, soil-bentonite mixture or an FML.

Figure 17:
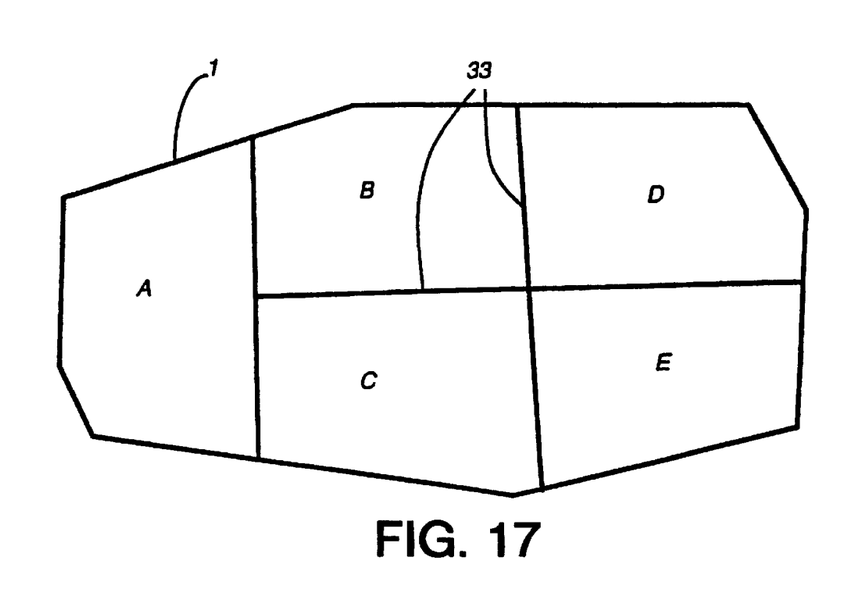
FIG. 17 is a top view of still another preferred embodiment of the present invention.

Compartmental Drainage Sink—If a single, continuous drainage sink is used for the entire landfill, the groundwater flow also occurs through the entire area of the drainage sink. Dividing the drainage sink into several compartments can reduce the flow rate through the aquitard. In FIG. 17, the internal barrier walls 33 divide the entire landfill area into five compartments. While the landfill on the compartment A is in operation, groundwater recovery and treatment is required only for the compartment A. By the time the compartment B is in operation, the compartment A landfill is closed with a final cover and the leachate contribution from the compartment A decreases. By the time the compartment C is in operation, the leachate contribution from compartment A will diminish and the compartment A may no longer require pumping. As a result, the pumping rate can be reduced significantly. In general, collecting and removing the leachate/groundwater mixture from less than all of the compartments at any one time will decrease the flow rate of groundwater through the aquitard.

Although illustrated and described herein with reference to certain specific embodiments, the present invention is nevertheless not intended to be limited to the details shown. For example, the invention can be applied to any combination of geologic units, although only a few specific combinations are described herein. Rather, various modifications may be made in the details within the scope and range of equivalents of the claims and without departing from the spirit of the invention.

What is claimed:

1. A method of containing and recovering leachate from a waste management unit at a waste management area having a groundwater level and a bottom barrier layer of low permeability material, said method comprising the steps of:

providing a perimeter barrier wall extending into said bottom barrier layer to contain, with said bottom barrier layer, a submerged drainage sink disposed below the groundwater level;

allowing mixing of leachate and groundwater within said drainage sink to form a leachate and groundwater mixture having a leachate level in said drainage sink;

inducing a flow pattern in directions from surrounding areas towards said drainage sink, by collecting and removing said mixture from said drainage sink to lower the leachate level in said drainage sink to a level:

(a) below the groundwater level outside of said wall; and (b) below the piezometric level below said sink;

covering said sink with earthen material in an amount sufficient to extend the top of said earthen material to a level above the groundwater level; and placing waste on top of said earthen material whereby all of said waste is above the groundwater level.

2. The method of claim 1, wherein collecting and removing said mixture from said drainage sink includes:

providing a plurality of perforated drain pipes at the bottom of said drainage sink for collecting said mixture;

connecting said plurality of drain pipes to at least one header pipe; and pumping said mixture from said drainage sink through said plurality of drain pipes and said at least one header pipe.

3. The method of claim 1, wherein:

the waste management area includes an uppermost water bearing geologic unit selected from an uppermost aquitard and an uppermost non-aquitard underlain by an uppermost aquitard;

said bottom barrier layer is said uppermost aquitard;

the step of providing said perimeter barrier wall includes extending said perimeter barrier wall into said uppermost aquitard to contain, with said uppermost aquitard, said submerged drainage sink and to define, with said uppermost aquitard, a containment zone; and the step of inducing said flow pattern includes inducing said flow pattern in directions: (a) from said uppermost water bearing geologic unit outside said wall towards said sink; and (b) from the area below said sink towards said sink.

4. The method of claim 3, wherein:

said uppermost water bearing geologic unit is said uppermost aquitard;

the waste management area further includes an aquifer located immediately beneath said uppermost aquitard; and the flow pattern is induced in directions: (a) from said uppermost water bearing geologic unit outside said wall towards said sink; and (b) from said aquifer towards said sink.

5. The method of claim 4, wherein the step of inducing said flow pattern further comprises:

extending said wall to a depth below said aquifer; and injecting water to said aquifer within said wall to maintain the piezometric level of said aquifer above the leachate level in said drainage sink.

6. The method of claim 1, wherein the step of inducing said flow pattern further comprises:

providing a second perimeter barrier wall radially outward of said first perimeter barrier wall to define a recharge trench having a water level; and intermittently pumping water to said recharge trench to maintain said water level above the leachate level in said drainage sink.

7. The method of claim 1, wherein the step of inducing said flow pattern further comprises vacuum pumping said drainage sink.

8. The method of claim 1 further comprising minimizing the flow towards said drainage sink.

9. The method of claim 8, wherein the step of minimizing the flow towards said drainage sink comprises using a low permeability material for said wall.

10. The method of claim 8, wherein the step of minimizing the flow towards said drainage sink comprises intermittently removing said mixture from said drainage sink.

11. The method of claim 8, wherein said bottom layer is selected from a synthetic layer or a constructed soil layer of low permeability and the step of minimizing the flow towards said drainage sink comprises providing said synthetic layer or said constructed soil layer of low permeability below said sink.

12. The method of claim 8, wherein the step of minimizing the flow towards said drainage sin compress:

dividing said waste management area into a plurality of compartments with at least one internal barrier wall;

placing landfill above said compartments sequentially; and pumping and removing said mixture from less than all of said plurality of compartments.

13. The method of claim 1, wherein the waste management area is initially a shallow water body having an original surface water level, and said method comprises first reclaiming said shallow water body such that the original surface water level becomes the groundwater level after construction of the waste management unit.

14. A waste management unit for containing and recovering leachate at a waste management area having a groundwater level and a bottom barrier layer of low permeability material, said unit comprising:

a perimeter barrier wall extending into said bottom barrier layer to contain, with said bottom layer, a submerged drainage sink disposed below the groundwater level;

means for inducing a flow pattern in directions from surrounding areas towards said drainage sink, including means for collecting and removing said mixture from said drainage sink to lower the leachate level in said drainage sink to a level:

(a) below the groundwater level outside of said wall; and (b) below the piezometric level below said sink;

a layer of earthen material covering said sink in an amount sufficient to extend the top of said earthen material to a level above the groundwater level; and a waste layer disposed on top of said earthen material layer whereby all of said waste is above the groundwater level.

15. The unit of claim 14, wherein said means for collecting and removing said mixture from said drainage sink include:

a plurality of perforated drain pipes at the bottom of said sink for collecting said mixture;

at least one header pipe connected to said plurality of drain pipes; and a pump for pumping said mixture through said plurality of drain pipes and said at least one header pipe.

16. The unit of claim 14, wherein said means for inducing said flow pattern further comprise:

a second perimeter barrier wall radially outward of said first perimeter barrier wall to define a recharge trench having a water level; and a pump for pumping water to said recharge trench to maintain said water level above the leachate level in said drainage sink.

17. The unit of claim 14, wherein:

the waste management area includes an uppermost water bearing geologic unit selected from an uppermost aquitard and an uppermost non-aquitard underlain by an uppermost aquitard;

said bottom barrier layer is said uppermost aquitard;

said perimeter barrier extends into said uppermost aquitard to contain, with said uppermost aquitard, said submerged drainage sink and to define, with said uppermost aquitard, a containment zone; and said flow pattern is induced in directions: (a) from said uppermost water bearing geologic unit outside said wall towards said sink; and (b) from the area below said sink towards said sink.

18. The unit of claim 17, wherein:

said uppermost water bearing geologic unit is said uppermost aquitard;

the waste management area further includes an aquifer located immediately beneath said uppermost aquitard; and said flow pattern is induced in directions: (a) from said uppermost water bearing geologic unit outside said wall towards said sink; and (b) from said aquifer towards said sink.

19. The unit of claim 18, wherein:

said wall extends to a depth below said aquifer; and said means for inducing said flow pattern further comprise a plurality of injection wells for injecting water to said aquifer within said wall to maintain the piezometric level of said aquifer above the leachate level in said drainage sink.

20. The unit of claim 14, wherein said means for inducing said flow pattern further comprise a vacuum pump for lowering the water pressure in said sink.

21. The unit of claim 14, wherein said wall is made of a low permeability material for minimizing the flow towards said drainage sink.

22. The unit of claim 14, wherein said bottom barrier layer is a synthetic layer or a constructed soil layer of low permeability for minimizing the flow towards said drainage sink.

23. The unit of claim 14 further comprising at least one internal barrier wall dividing said waste management area into a plurality of compartments.

24. A method of containing and recovering leachate from a waste management unit at a waste management area which is a valley having a shallow groundwater level, a valley floor, at least one valley slope extending from a topographic ridge to said valley floor, a groundwater ridge, and a valley bottom, and underlain by a low permeability geologic unit, said method comprising the steps of:

allowing mixing of leachate and groundwater within a containment zone to form a leachate and groundwater mixture having a leachate level, said containment zone defined by the groundwater ridge along the topographic ridges, the valley floor, and a barrier wall installed across the valley floor at the lowest edge of the waste management area, said barrier wall extending into said low permeability geologic unit and to a length sufficient to contain said leachate and groundwater mixture;

installing a drainage sink comprising a blanket drain and a plurality of trench drains in said valley floor including a bottom trench drain disposed at said valley bottom and a barrier trench drain disposed adjacent and inside of said barrier wall, each of said trench drains containing a drain pipe and disposed below the groundwater level;

installing a valley bottom recharge trench adjacent and outside of said barrier wall;

installing at least one ridge recharge trench at the top of said at least one valley slope and inside of said groundwater ridge; and inducing a flow pattern in directions from the containment zone boundary towards said drainage sink by selectively:
(a) removing said mixture from said drain pipes to decrease the leachate level in said drainage sink and inside said barrier wall;
(b) adding water to said valley bottom recharge trench to increase the groundwater level adjacent and outside of said barrier wall; and
(c) adding water to said at least one ridge recharge trench to increase the groundwater level at the top of said at least one valley slope;

such that the leachate level within said drainage sink is less than the groundwater level along the boundary of said containment zone.

25. A system for containing and recovering leachate from a waste management unit at a waste management area which is a valley having a shallow groundwater level, a valley floor, at least one valley slope extending from a topographic ridge to said valley floor, a groundwater ridge, and a valley bottom, and underlain by a low permeability geologic unit, said system comprising:

a barrier wall extending into said low permeability geologic unit and across said valley floor to a length sufficient to contain a leachate and groundwater mixture, having a leachate level, within a containment zone defined by said groundwater ridge, said valley floor, and said barrier wall;

a drainage sink compressing a blanket drain and a plurality of trench drains in said valley floor including at least one bottom trench drain disposed at said valley bottom and a barrier trench drain disposed adjacent and inside of said barrier wall;

a plurality of drain pipes individually disposed in said plurality of trench drains;

at least one valley bottom recharge trench adjacent and outside of said barrier wall;

at least one ridge recharge trench at the top of said at least one valley slope and inside of said topographic ridge;

means for inducing a flow pattern in directions from the containment zone boundary towards said drainage sink, including means for selectively:
(a) removing said mixture from said drain pipes to decrease the leachate level in said drainage sink and inside said barrier wall;
(b) adding water to said valley bottom recharge trench to increase the groundwater level adjacent and outside of said barrier wall; and
(c) adding water to said at least one ridge recharge trench to increase the groundwater level at the top of said at least one valley slope;

such that the leachate level within said drainage sink is less than the groundwater level along the boundary of said containment zone.

* * * * *

UNITED STATES PATENT AND TRADEMARK OFFICE
CERTIFICATE OF CORRECTION

PATENT NO. : 5,885,026
DATED : March 23, 1999
INVENTOR(S) : Daekyoo Hwang

It is certified that error appears in the above-indentified patent and that said Letters Patent is hereby corrected as shown below:

At column 14, line 2, delete "sin compress" and insert --sink comprises--.

Signed and Sealed this

Twenty-sixth Day of October, 1999

Attest:

Q. TODD DICKINSON

*Attesting Officer*  *Acting Commissioner of Patents and Trademarks*